United States Patent Office 3,284,492
Patented Nov. 8, 1966

3,284,492
PREPARATION OF CARBOXYLIC ACIDS
Maximilian I. Fremery and Ellis K. Fields, Chicago, Ill., assignors to Standard Oil Company, Chicago, Ill., a corporation of Indiana
No Drawing. Filed July 13, 1962, Ser. No. 209,746
17 Claims. (Cl. 260—523)

This invention relates to the preparation of carboxylic acids. More particularly, it relates to the ozonization of organic compounds containing a non-aromatic —CH=CH— group.

Recent developments of simplified techniques for ozone preparation make ozone increasingly an important oxidant in large-scale oxidation processes and diminish rapidly the traditional ill-fame associated with its hazards and cost. The key for the effective application of ozone lies in avoiding ozonide accumulation or isolation prior to the subsequent decomposition by further oxidation, reduction, or solvolysis. Ideally the high reactive and unstable ozonide should be converted quickly and simply to the desired product.

The reaction of ozone with unsaturated organic compounds has been known for many years, and has been the subject of extensive study. The art relating thereto has been collected and analyzed by Long in "The Ozonization Reaction," Chemical Reviews, 27, 437–493 (1940), and in a more recent extensive review by Bailey, Chemical Reviews, 58, 925 (1958). It reacts for example, with cyclohexene to form adipic acid and with acenaphthylene to form 1,8-naphthalic acid. These oxidations however, involve two steps, namely the formation and accumulation of the ozonide in an inert solvent, and the oxidation of this ozonide—a procedure involving a change in solvent, hazards, and expense.

Many methods for the preparation of carboxylic acids by the ozonolysis of unsaturated organic compounds followed by oxidative decomposition of the ozonides are known. Besides oxygen, hydrogen peroxide has been used as oxidant, usually in formic or acetic acids. In these cases the actual oxidizing agent is probably performic or peracetic acid. Silver oxide suspended in sodium hydroxide, potassium permanganate, and chromic acid have also been used. In order to merge the two reaction steps, ozonation and oxidation, into one, the ozonide or ozone-adduct must be reacted immediately after its formation with an oxidizing component which preferably acts also as reaction medium.

Many methods have been developed for preparing useful products from the ozonides, such as hydrogenation to convert them into alcohols, hydrolysis to convert them into a mixture of aldehydes and acids, oxidation to convert them into acids, and the like. In all of the various methods, serious difficulties have heretofore been encountered in controlling the rate of the reaction and the composition of the resulting reaction product.

A new one-step ozonization method has been discovered for the preparation of carboxylic acids from organic compounds containing a non-aromatic —CH=CH— group in which the ozonization reaction, decomposition and oxidation of the resulting ozonides are carried out simultaneously for maximum production of carboxylic acids with minimum production of aldehydes and other oxygenated products.

When carboxylic acids are prepared from unsaturated organic compounds via ozonide formation obtained by treatment of the unsaturated compounds with ozone, such ozonides must first be decomposed and the decomposition products subsequently oxidized to convert the intermediate oxygenated products to carboxylic acids. Consequently, when the ozonization reaction is carried substantially to completion, and the resulting ozonides are subsequently hydrolyzed by reaction with water, the hydrolysis reaction is in some cases so violent that there is serious danger of explosion, and the hydrolysis mixture tends to become overheated, so that the yield of products is lowered through degradation of reaction materials, while in other cases the ozonides are extremely resistant to the action of water. It has been discovered that these difficulties can be avoided by simultaneously carrying out the hydrolysis of the ozonides and oxidation of the ozonide decomposition product in situ as formed. This is advantageously effected by forming an emulsion of the unsaturated organic compound in aqueous alkaline hydrogen peroxide and subsequently passing a gasiform stream containing ozone through the emulsion. The ozone is readily absorbed from the ozone-bearing gas stream (air, oxygen, or an inert gas), and the resulting ozonides are immediately hydrolyzed and the oxygenated decomposition products are immediately oxidized, with the result that the ozonide concentration remains extremely low.

The method of this invention for the preparation of carboxylic acids comprises: forming an aqueous emulsion of (A) an organic compound containing a non-aromatic —CH=CH— group, (B) hydrogen peroxide, and (C) an alkaline compound of a metal of the group consisting of alkali and alkaline earth metals, said emulsion containing per mole of said organic compound at least one mole of hydrogen peroxide and at least two moles of said alkaline compound; and passing ozone through said emulsion at a temperature not greater than about 35° C. The carboxylic acids thus formed by the oxidation of the ozone-organic compound-adduct in the aqueous alkaline hydrogen peroxide solution are immediately converted to the water-soluble salts. Isolation of the relatively pure acids obtained in high yields involves only acidification of the water solution and recovery of the water-insoluble acids by filtration or, in case of water-soluble acids, by evaporation of the water.

The method of this invention is applicable broadly to the treatment of organic compounds containing the non-aromatic —CH=CH— group. Such organic compounds containing the ethylenic double bond, non-aromatic —CH=CH— group are generally referred to as olefins and will be hereinafter referred to for purposes of brevity as an olefin. It is to be understood that such organic compounds are not restricted to those compounds containing only carbon and hydrogen. In other words, any organic compound (olefin) containing the non-aromatic —CH=CH— group and wherein such group is not an intimate part of an aromatic nucleus is susceptible to treatment in accordance with this invention for the cleavage of the carbon-to-carbon double bond and formation of carboxyl groups. Depending upon the structure of the olefin, the resulting products are mono- or di-carboxylic acids. In general, the olefins are characterized as aliphatic alkenes, cycloalkenes, containing 1 or more —CH=CH— groups. Such alkenes can contain aromatic, halogen, nitro, carboxy, polycarboxy, alkoxy, aryloxy, or cyano substituents in their structure. Condensed ring compounds wherein an aromatic nucleus is fused with a cycloalkene ring are also susceptible to treatment for the production of aromatic dicarboxylic acids. The linear olefins containing the terminal —CH=CH— grouping are converted to formic acid and monocarboxylic acid containing one less carbon atom than in its original structure. For example, octene-1 is converted to formic acid and heptanoic acid. Olefins and aliphatic acids containing internal —CH=CH— groups can likewise be converted to corresponding mono- and di-carboxylic acids of shorter chain length. The cycloalkenes containing three or more carbon atoms in their ring structure and a single —CH=CH— group are converted to the corresponding alpha-omega-dicarboxylic acids. Cycloalkenes containing more than one —CH=CH— group are in general converted to dicarboxylic acids corresponding to the number of carbon atoms in the chain between each of the —CH=CH— groups. Such dicarboxylic acids are the alpha-omega- or terminal aliphatic dicarboxylic acids. Dicycloalkenes are converted to the corresponding cyclic dicarboxylic acids. Aryl-substituted alkenes can be converted to the corresponding aryl-substituted aliphatic carboxylic acids or to aromatic mono- or di-carboxylic acids. For example, styrene can be ozonized to form benzoic acid and formic acid. The —CH=CH— groups in aromatic nuclei are not susceptible to cleavage under the reaction conditions of this invention. Consequently, it is essential that the olefinic organic compounds contain non-aromatic —CH=CH— groups. Cleavage of the non-aromatic —CH=CH— group, in accordance with this invention is of commercial significance. It is now possible to produce commercially significant yields of desired mono-carboxylic and dicarboxylic acids from appropriate olefinic starting material with a minimum formation of peroxy polymers and aldehydes in one step, rather than the number of successive steps required by prior art procedures.

In carrying out the method of this invention, an aqueous alkaline hydrogen peroxide emulsion is first established. In the emulsion, the olefinic compound exists as the finely divided dispersed phase in the continuous aqueous alkaline hydrogen peroxide phase. The emulsion is normally established by adding the olefinic compound to the vigorously agitated aqueous phase. Agitation of the mixed phases is effected by means of a stirrer operating at a speed sufficiently high to disperse the olefinic compound in finely divided form, thereby providing a large surface of contact between the phases. After the aqueous emulsion is established, a stream of air or oxygen which has been treated in a conventional manner to produce ozone therein or a stream of an inert gas, such as nitrogen to which ozone has been added, suitably but not necessarily having an ozone concentration of between about 2 and 8%, is passed into the mixture wtih continued agitation. The ozone is absorbed rapidly and completely until the desired amount of the olefinic compounds has been ozonized. While ozone can be passed into the aqueous emulsion until substantially all of the olefinic compound has been ozonized, it is preferentially advantageous to stop the introduction of the ozone prior to the appearance of free ozone in the vent gases. Incomplete ozonization of the olefinic compound minimizes overoxidation of the olefinic compound and production of undesirable reaction products. The resulting reaction mixture is then treated in a conventional manner to isolate the reaction products. For example, the mixture is allowed to stratify and the organic phase is withdrawn. Acidification of the aqueous solution precipitates the relatively pure acids which are removed by filtration. When water-soluble acids are formed, simple evaporation of the aqueous phase is sufficient to recover the relatively pure acids.

In the preparation of the aqueous emulsion, it is essential that the aqueous phase contain at least one mole of hydrogen peroxide per mole of olefin charged to the reaction vessel. Inasmuch as there is accelerated decomposition of hydrogen peroxide in alkaline solution, it is necessary that an excess of hydrogen peroxide be added. The minimum concentration of the alkaline compound is two moles per mole of olefin charged. The alkaline compound can be an oxide, or hydroxide, or a basic salt of the alkali and alkaline earth metals. Among the suitable compounds are sodium hydroxide, potassium hydroxide, lithium hydroxide, calcium hydroxide, barium hydroxide, sodium acetate, dipotassium hydrogen phosphate and the like. It is preferred to use an excess of the alkali to assure the formation of the carboxylic acid salts as the carboxyl group is formed, and thus remove the salt from the dispersed hydrocarbon phase into the aqueous phase, and thereby minimize side reactions.

The liquid olefinic compounds can be added directly to the aqueous phase and dispersed therein. In the case of solid olefinic compounds, the successful preparation of the aqueous emulsion is effected by first making a solution of the solid olefin in an atropic solvent. An atropic solvent is a material that does not contain active hydrogen. Atropic solvents suitable for preparing aqueous emulsions of solid emulsions are carbon tetrachloride, chlorobenzene, xylene, and ethers.

The simultaneous ozonizing, ozonide decomposition and oxidation reactions are satisfactorily carried out at atmospheric pressure. For gaseous olefinic compounds, the reaction can be conducted under superatmospheric pressure sufficient to keep the gaseous olefin in the liquid state. The reaction may be conducted at temperatures within the range of from about $-35°$ to about $35°$ C. and preferably between about $5°$ and $15°$ C.

The olefin concentration in the aqueous emulsion is not critical. However, maximum formation of the carboxylic acids is obtained when the olefin concentration is within the range of from about 5 to about 30%, and preferably within the range of 10 to 15%.

It has been found advantageous to use from about 0.5 to about 6%, preferably 1 to 2% of an emulsifying agent that is inert under the strong oxidation conditions existing during the reaction. Such emulsifying agent aids in obtaining an extremely finely divided dispersion of the olefinic compound. The emulsifier must be stable to the alkaline reaction medium, hydrogen peroxide, oxygen and ozone. These conditions exclude all emulsifiers with hydrophilic groups which undergo oxidation and/or saponification. Non-ionic surfactants have the desired attributes, and have been found to have superior emulsifying characteristics to produce the desired olefin particle size in the aqueous emulsion. A polyoxyethylene lauryl alcohol, available under the trade name Brij 30, has been found to be highly efficacious as an emulsifier for use in the present method for the preparation of carboxylic acids from olefinic compounds. While it is advantageous to use emulsifying agents in the preparation of the aqueous emulsion, such agents are not necessary so long as there is adequate dispersion of the olefin in the aqueous alkaline hydrogen peroxide phase.

The aqueous emulsion can be established in any manner known in the art. For example, the olefin can be added to vigorously agitated water, and then the alkali and hydrogen peroxide with or without additional water can be added to the mixture of the olefin and water. Or, the olefin can be added to the vigorously agitated solution of aqueous alkali and hydrogen peroxide solution containing the desired quantities of water. When an emulsifier is used, such emulsifier is preferably admixed with the olefin or atropic solution thereof prior to addition to the aqueous phase.

In the illustrattive embodiments of this invention presented in the following examples, the reaction vessel was a three-neck 1500 ml. indented flask provided with a high-speed stirrer, a gas inlet tube and disperser, gas vent and thermometer. The reaction temperature of the described experiments was about $10°$ C. It was maintained by placing the reaction flask in an ice-water bath.

*Example 1*

In this example, indene was converted to homophthalic acid. An emulsion of 80 g. (ca. 0.7 mole) indene (technical grade) in 600 ml. distilled water was established by the addition of the olefin-containing 4 g. polyoxyethylene lauryl alcohol (Brij 30) as the emulsifier to the vigorously agitated water in the reaction flask. A saturated aqueous solution of 56 g. sodium hydroxide (2 mole equiv.) and 116 g. of 30 percent hydrogen peroxide (1.5 mole equiv.)

was then added to the vigorously agitated emulsion of olefin and water. With continued stirring, an ozone-oxygen stream containing 3 weight percent ozone was passed into the aqueous emulsion. The reaction was interrupted after the absorption of 23 g. ozone, leaving 25 g. indene unreacted as a safety margin for the prevention of over-ozonization. The resulting reaction mixture was stirred for an additional hour. 20 g. of sodium chloride were then added to the reaction mixture to assist in the demulsification. Therefater, the aqueous phase was separated from the stratified organic and aqueous phases obtained by holding the mixture for about 16 hours. Acidification of the clear aqueous solution with hydrogen chloride precipitated the homophthalic acid. After filtration, the acid was washed with water and dried at 70° C. and 60 mm. Weight of the product was 80 g., having a melting point of 170° C. Steam distillation of the organic layer consisting of peroxy polymer and indene gave 16 g. of indene and 7 g. peroxy polymer. Acidification of the residue after filtration from polymeric products gave 6 more grams homophthalic acid and 5 g. homophthalide. Overall yield of homophthalic acid from this reaction was 86 g. (83 mole percent). The homophthalic acid was identified by mixed melting points and IR-spectra with authentic homophthalic acid.

When other types of emulsifiers are used in the conversion of indene to homophthalic acid in accordance with this invention, the yield of homophthalic acid is significantly reduced. For example, in additional experiments under identical conditions, but using sodium lauryl sulfate, sodium stearate and a commercial long-chain N-alkyl-sodium benzene sulfonate as the emulsifiers, only 14 mole percent, 7 mole percent, and 18 mole percent of homophthalic acid respectively were given.

Example II

In this example the aromatic dicarboxylic acid, naphthalic acid (1,8-naphthylene dicarboxylic acid) was obtained from acenaphthylene.

70 g. acenaphthylene was dissolved in 100 ml. carbon tetrachloride and 50 ml. of this solution was added with vigorous agitation to about 750 ml. distilled water containing 0.8 g. sodium lauryl sulfate, 40 g. sodium hydroxide and 18 g. of 90 percent hydrogen peroxide. Thereafter, an ozone-oxygen mixture containing about 4% ozone was passed through the emulsion. To maintain the solid acenaphthylene in dispersed solution, small additional amounts of carbon tetrachloride were added to compensate for the carbon tetrachloride carried out with the vent gases. At approximately 30-minute intervals the balance of the acenaphthylene-carbon tetrachloride solution was added in 10 ml. increments. After passing ozone through the emulsion for six hours, the reaction was interrupted. After stratification, the organic layer consisting of excess acenaphthylene and solvent was separated from the clear aqueous solution. Acidification of the aqueous solution with concentrated hydrogen chloride precipitated the naphthalic acid as colorless to pale yellow crystal agglomerates. The solution was filtered. The acid crystals were washed with water till neutral and then dried, giving 64 g. of acid (97 mole percent). The naphthalic acid obtained was identified (as anhydride) by mixed melting points and IR-spectra with authentic naphthalic acid.

In another experiment 51 g. naphthalic acid (82 mole percent) was obtained by passing ozone through an aqueous emulsion of the acenaphthylene until free ozone appeared in the vent gas as evidenced by the appearance of blue color in a potassium-iodide starch indicator solution in the vent gas outlet. In this experiment 50 g. of acenaphthylene was dissolved in 50 ml. chlorobenzene and this solution together with 4 g. Brij 30 was added to about 600 ml. of water containing 26 g. sodium hydroxide (2 mole equiv.) and 37 g. of 30 percent hydrogen peroxide (1 mole equiv.). After the addition of 15 g. ozone, free ozone appeared in the vent gases. The resulting reaction mixture was permitted to stratify and naphthalic acid recovered by acidification of the aqueous solution. Approximately 1 g. of acenaphthylene and 5 g. of peroxy polymer were recovered from the organic phase.

Example III

Adipic acid was obtained by the ozonization of an aqueous emulsion of cyclohexene. The emulsion was composed of 80 g. cyclohexene, 150 g. of 30 percent hydrogen peroxide (1.4 mole equiv.), 80 g. sodium hydroxide (2 moles equiv.) and about 3 g. Brij 30 in approximately 600 ml. of water. An ozone-oxygen stream containing about 3 weight percent ozone was passed through the emulsion until 18 g. ozone was absorbed by the olefin. The resulting reaction mixture was allowed to stand and stratify into the organic and aqueous layers. The aqueous solution was acidified with concentrated hydrochloric acid. Recovery of a relatively water-soluble adipic acid was effected by evaporating the acidified aqueous phase to dryness and the residue was extracted with anhydrous ethanol. Evaporation of the solvent left the crude acid, which was purified either by washing with ether or by recrystallization. Yield of adipic acid identified by mixed melting points and IR-spectra with authentic adipic acid was 21 g. (26 mole percent). Approximately 19 g. of a peroxy polymer was also recovered.

During the isolation of a water-soluble diacid, a small amount of an oily product separated, which was identified as delta-hydroxyvaleric acid.

Substitution of the oxygen by nitrogen as the ozone carrier gas minimized the side reactions present in the above ozonization-peroxidation of cyclohexene. For this purpose the oxygen-ozone mixture was separated by ozone adsorption on $SiO_2$ or $Al_2O_3$ and subsequently desorbed with nitrogen. Separated oxygen can be recycled for further ozone generation.

Example IV

Cyclooctene was ozonized to suberic acid. An oxygen-ozone stream containing about 3 weight percent ozone was passed through an aqueous emulsion of 80 g. cyclooctene, 130 g. (1.5 mole equiv.) 30 percent hydrogen peroxide, 58 g. (2 mole equiv.) sodium hydroxide and about 3 g. Brij 30 in about 600 ml. distilled water until 16 g. ozone had been adsorbed. Acidification of the aqueous phase of the concentrated hydrochloric acid after stratification and separation gave 62 g. (63 mole percent) of relatively water-soluble dibasic acid recovered by total water evaporation and identified as suberic acid and mixed melting point and IR-spectra with authentic suberic acid. There was also recovered 20 g. cyclooctene, 14 g. peroxy polymer and also a small amount ca. 12 g. (15 mole percent) terminal hydroxy-acid identified as 7-hydroxyheptanoic acid.

Example V

When cyclooctadiene was similarly ozonized, cleavage of both of the —CH=CH— groups occurred to produce two parts of succinic acid per cyclic olefin. 1,6-dicarboxyhexene-3 was obtained in 52% yield when cyclooctadiene was used in large excess for ozonization. It was identified as the diethyl ester, B.P. 90°/0.1.

*Analysis*: $C_{12}H_{20}O_4$.—Calc.: C, 63.2%; H, 8.8%. Found: C, 62.9%; H, 8.8%.

Example VI 1,5,9-cyclododecatriene prepared according to the Wilke et al. German Provisional Patent 1,043,329, by trimerizing butadiene with chromyl chloride and aluminum triisobutyl as catalyst gave a mixture of cis, trans, trans and all-trans isomers. This tri-unsaturated cyclic olefin, analogous to the behavior of cyclooctadiene, reacted by a partial ozonization cleavage when used in large excess, giving a yield of 60 mole percent of 4,8-dodecadienedioic acid having the formula

HOOC—CH$_2$—CH$_2$—CH=CH—CH$_2$—CH$_2$—CH=CH—CH$_2$—CH$_2$—COOH

This diacid was formed by cleavage of one double bond with minor amounts of higher cleavage products.

The emulsion containing this olefin was established by admixing 100 g. cyclododecatriene, 80 g. (1.2 mole equiv.) 30 percent hydrogen peroxide, 50 g. (2 mole equiv.) sodium hydroxide and about 3 g. of Brij 30 in about 600 ml. of water. After absorption of 16 g. ozone from the ozone-oxygen stream containing about 3 weight percent ozone the reaction was terminated. The resulting reaction mixture was permitted to stratify and the aqueous phase separated therefrom. Acidification of the aqueous phase with concentrated hydrochloric acid and evaporation of the water gave 42 g. (60 mole percent) of the unsaturated dicarboxylic acid.

4,8-dodecadienedioic acid was identified by (1) Analysis: $C_{12}H_{18}O_4$ (226).—Calc.: C, 63.8%; H, 8.1%. Found: C, 63.5%; H, 8.3%.
(2) Bromine No.: Calc.: 140, found: 138.
(3) IR spectrum identical with that of the acid synthesized by another route described in the following paragraphs of this example.
(4) M.P.: 161° C.
(5) Acid number: Calc.: 495, found: 491.

The 4,8-dodecadienedioic acid was obtained also by monoepoxidation of cyclododecatriene, subsequent acetolysis of the epoxy-group to form the corresponding 1,2-hydroxy - acetoxy - cyclododecadiene - 5,9 and oxidative cleavage by a solution of chromium oxide in acetic acid.

To 100 g. cyclododecatriene-1,5,9 and 100 ml. acetic acid in a 500 ml. 4-neck flask, equipped with thermometer, stirrer, reflux condenser and dropping funnel, at 30° C. were added 120 g. of 40 percent peracetic acid in acetic acid (1 mole+5% excess) in one hour. The reaction mixture was kept at 30° C. by cooling. After three hours, 1 ml. concentrated sulfuric acid was added and the mixture was slowly heated to 70° C. over three hours. After 12 hours the acetolysis of the epoxy ring was completed and the reaction mixture containing hydroxy acetoxy cyclododecadiene was cooled to room temperature. It was transferred to a one-liter 3-neck flask, equipped with thermometer, stirrer and dropping funnel. One mole of chromic anhydride (4% concentration in 50% aqueous acetic acid) was then added with stirring to the reaction mixture over a 2.5 hour period, while maintaining the temperature of the reaction mixture at about 30° C. After additional two hours, the reaction mixture was separated from inorganic precipitate by filtration and the acetic acid was evaporated at 20 mm. Hg. The distillation residue was diluted with water (1:1), added to one liter of 4 N sodium hydroxide. The saponification was run at 50° C. for 15 hours. After being filtered from the voluminous chromous hydroxide, the aqueous solution was strongly acidified with concentrated hydrochloric acid at 20° C. The precipitate was extracted with ether, washed with water, and dried with magnesium sulfate. The ether was evaporated and the product recrystallized twice from water to form colorless needles of 4,8-dodecadienedioic acid, M.P. 161° C. Yield: ca. 10 mole percent.

Example VII

The ozonization of 50 g. of 4-cyclohexene-1,2-dicarboxylic anhydride in 54 g. (1.5 mole equiv.) 30 percent hydrogen peroxide, 25 g. (2 mole equiv.) sodium hydroxide and 600 ml. water with 16 g. ozone gave 53 g. (73 mole percent) of 1,2,3,4-tetracarboxy butane. Due to the water solubility of the tetracarboxy acid, the hydrochloric acid acidified aqueous reaction mixture was evaporated completely for product isolation. The tetracarboxy butane was identified as its tetraethyl ester.

Analysis: $C_{16}H_{26}O_8$ (346).—Calc.: C, 55.4%; H, 7.6%. Found: C, 55.1%; H, 7.7%.
B.P.: 145° C. $4 \times 10^{-2}$ mm.

Example VIII

When octene-1, an open-chain olefin, was ozonized under the same conditions as described above, there was obtained n-heptanoic acid in 75 mole percent yield. Formic acid was also formed, but the amount thereof not determined.

Example IX

Norbornylene, a bicyclic monoolefin, was similarly treated with ozone giving 90 weight percent 1,3-dicarboxycyclopentane, which was isolated as its diethyl ester. The diethyl ester had a boiling point of 60–66° C. at 5 mm. and a mass spectrometer molecular weight of 214.

Example X

When an aqueous emulsion of technical grade divinyl benzene was ozonized in the manner herein described, there was obtained a mixture of isophthalic and terephthalic acids, along with a small amount of vinyl benzoic acid.

It will now be apparent to those skilled in the art that the present invention provides a novel method for the production of dibasic and monobasic acids from olefinic compounds containing at least one non-aromatic —CH=CH— group. Thus it is possible to produce monobasic acids from open-chain olefins. Alpha-omega dicarboxylic aliphatic acids can be obtained by the cleavage of ring olefins or by the cleavage of unsaturated fatty acids such as oleic acid to yield azelaic and pelargonic acids. In addition, the invention is also applicable for the production of aromatic dicarboxylic acids wherein the carboxyl group is attached to the aromatic nucleus or to an alkyl group separating the aromatic nucleus and the carboxylic group, such as phenylene diacetic acid obtained by the ozonolysis of 1,4-dihydronaphthylene.

While the present invention has been described in connection with certain specific charge stocks, reaction conditions and manipulative techniques, it is to be understood that it is not limited thereto.

Thus, having described the invention, what is claimed is:

1. The method for the preparation of carboxylic acids which comprises: forming an aqueous alkaline emulsion of (A) an organic compound containing a non-aromatic —CH=CH— group, (B) hydrogen peroxide, and (C) an alkaline compound of a metal of the group consisting of alkali and alkaline earth metals, said emulsion containing per mole of said organic compound at least one mole of hydrogen peroxide and at least two moles of said alkaline compound; and passing ozone through said emulsion at a temperature between about −35° C. and about 35° C.

2. The method of claim 1 wherein said alkaline compound is an alkali metal hydroxide.

3. The method of claim 1 wherein said alkaline compound is sodium hydroxide.

4. The method of claim 1 wherein said emulsion also contains an emulsifier.

5. The method of claim 4 wherein said emulsifier is a non-ionic surfactant.

6. The method of claim 1 wherein said organic compound is a polycyclic compound containing a non-aromatic —CH=CH— group in a carbocyclic ring.

7. The method of claim 1 wherein said organic compound is a cycloolefin.

8. The method of claim 1 wherein said organic compound is cyclooctene.

9. The method of claim 1 wherein said organic compound is cyclododecatriene.

10. The method of claim 1 wherein said organic compound is indene.

11. The method of claim 1 wherein said organic compound is acenaphthylene.

12. The method of claim 1 wherein said organic compound is 4-cyclohexene-1,2-dicarboxylic anhydride.

13. The method for the preparation of naphthalic acid which comprises forming an aqueous emulsion of (A) acenaphthylene in an atropic solvent (B) hydrogen peroxide, (C) sodium hydroxide, and (D) an emulsifier, said emulsion containing at least one mole of hydrogen peroxide and at least two moles of sodium hydroxide per mole of acenaphthylene; and passing ozone through said emulsion at a temperature between about 5 and 15° C.

14. The method for the preparation of homophthalic acid which comprises: forming an aqueous emulsion of (A) indene, (B) hydrogen peroxide, (C) sodium hydroxide, and (D) an emulsifier, said emulsion containing at least one mole of hydrogen peroxide and at least two moles of sodium hydroxide per mole of said indene; and passing ozone through said emulsion at a temperature between about 5 and 15° C.

15. The method for the preparation of suberic acid which comprises: forming an aqueous emulsion of (A) cyclooctene, (B) hydrogen peroxide, (C) sodium hydroxide, and (D) an emulsifier, said emulsion containing at least one mole of hydrogen peroxide and at least two moles of sodium hydroxide per mole of said cyclooctene; and passing ozone through said emulsion at a temperature between about 5 and 15° C.

16. The method for the preparation of 4,8-dodecadienedioic acid which comprises: forming an aqueous emulsion of (A) cyclododecatriene, (B) hydrogen peroxide, (C) sodium hydroxide, and (D) an emulsifier, said emulsion containing at least one mole of hydrogen peroxide and at least two moles of sodium hydroxide per mole of said cyclododecatriene; and passing ozone through said emulsion at a temperature between about 5 and 15° C.

17. The method for the preparation of 1,2,3,4-tetracarboxybutane acid which comprises: forming an aqueous emulsion of (A) 4-cyclohexene-1,2-dicarboxylic anhydride, (B) hydrogen peroxide, (C) sodium hydroxide, and (D) an emulsifier, said emulsion containing at least one mole of hydrogen peroxide and at least two moles of sodium hydroxide per mole of said 4-cyclohexene-1,2-dicarboxylic anhydride; and passing ozone through said emulsion at a temperature between about 5 and 15° C.

References Cited by the Examiner
UNITED STATES PATENTS 2,819,279 1/1958 Brown et al. _____ 260—533 X
3,059,028 10/1962 Perry _____ 260—533

OTHER REFERENCES

O'Connor et al.: "Ind. and Engineering Chem.," vol. 49, No. 10, pp. 1701–1702, October 1957.

Marvel et al.: "J. Org. Chem.," vol. 16 (1951), pp. 838–853.

Long: "The Ozonization Reaction," Chemical Reviews, vol. 27 (1940), p. 452.

LORRAINE A. WEINBERGER, *Primary Examiner.*

LEON ZITVER, *Examiner.*

R. K. JACKSON, S. B. WILLIAMS, *Assistant Examiners.*